US009806584B2

(12) United States Patent
Bailey et al.

(10) Patent No.: US 9,806,584 B2
(45) Date of Patent: Oct. 31, 2017

(54) DIRECT DRIVE ROTOR WITH METAL COUPLER

(71) Applicant: Nidec Motor Corporation, St. Louis, MO (US)

(72) Inventors: Daniel E. Bailey, Ballwin, MO (US); Daniel E. Hilton, St. Louis, MO (US); Philip S. Johnson, Granite City, IL (US); Gregory M. Levine, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 15/203,656

(22) Filed: Jul. 6, 2016

(65) Prior Publication Data
US 2016/0315520 A1    Oct. 27, 2016

Related U.S. Application Data

(63) Continuation of application No. 14/270,083, filed on May 5, 2014, now Pat. No. 9,391,487, which is a continuation of application No. 13/916,481, filed on Jun. 12, 2013, now Pat. No. 8,716,912, which is a continuation of application No. 13/686,718, filed on Nov. 27, 2012, now Pat. No. 8,482,176, which is a continuation of application No. 12/893,816, filed on Sep. 29, 2010, now Pat. No. 8,344,568.

(60) Provisional application No. 61/374,578, filed on Aug. 17, 2010.

(51) Int. Cl.
*H02K 1/04* (2006.01)
*H02K 7/00* (2006.01)
*D06F 37/30* (2006.01)
*H02K 1/27* (2006.01)
*H02K 1/30* (2006.01)
*H02K 5/08* (2006.01)
*H02K 15/12* (2006.01)

(52) U.S. Cl.
CPC ............ *H02K 7/003* (2013.01); *D06F 37/304* (2013.01); *H02K 1/2786* (2013.01); *H02K 1/30* (2013.01); *H02K 5/08* (2013.01); *H02K 15/12* (2013.01)

(58) Field of Classification Search
CPC ................................. H02K 1/30; H02K 7/003
USPC ........................... 310/43, 90, 156.01–156.84
See application file for complete search history.

(56) References Cited

U.S. PATENT DOCUMENTS

| 7,355,315 | B2 * | 4/2008 | Ju ......................... | D06F 37/304 310/261.1 |
|---|---|---|---|---|
| 2003/0006665 | A1 * | 1/2003 | Kim ..................... | D06F 37/304 310/231 |
| 2005/0140232 | A1 * | 6/2005 | Lee ....................... | D06F 37/304 310/156.26 |
| 2006/0091754 | A1 * | 5/2006 | Kim ..................... | H02K 1/2786 310/156.55 |
| 2012/0169155 | A1 * | 7/2012 | Jang ...................... | F04D 29/056 310/43 |
| 2013/0187500 | A1 * | 7/2013 | Bailey .................... | H02K 1/187 310/91 |
| 2013/0328432 | A1 * | 12/2013 | Hoemann ............ | H02K 1/2786 310/156.12 |

\* cited by examiner

*Primary Examiner* — Thanh Lam
(74) *Attorney, Agent, or Firm* — Hovey Williams LLP

(57) ABSTRACT

A rotor for an outer rotor-type motor is provided. The rotor includes a metallic coupler and a polymeric frame molded over at least part of the metallic coupler.

20 Claims, 3 Drawing Sheets

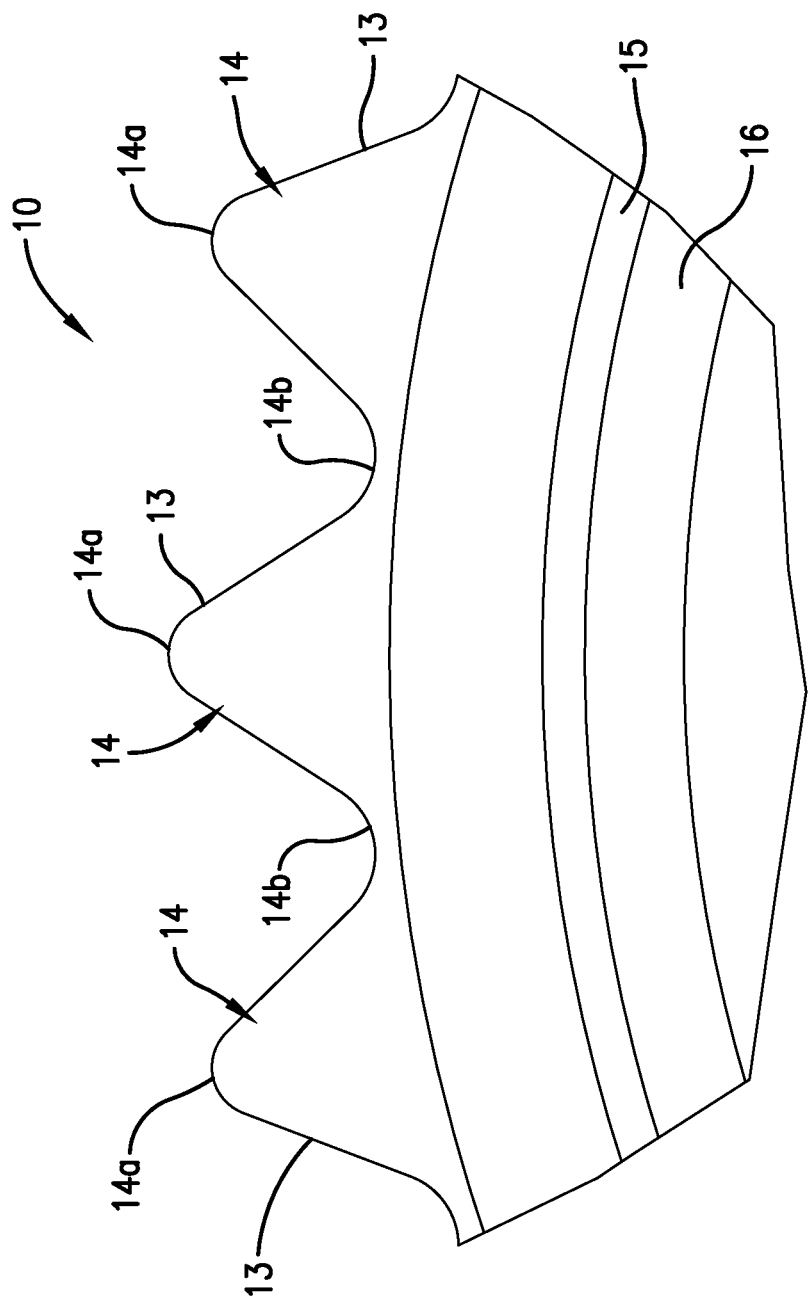

DIRECT DRIVE ROTOR WITH METAL COUPLER

CROSS-REFERENCE TO RELATED APPLICATIONS

This is a continuation of U.S. patent application Ser. No. 14/270,083, filed May 5, 2014, which is a continuation of U.S. patent application Ser. No. 13/916,481, filed Jun. 12, 2013, which is a continuation of U.S. patent application Ser. No. 13/686,718, filed Nov. 27, 2012, which is a continuation of U.S. patent application Ser. No. 12/893,816, filed Sep. 29, 2010, which claims the benefit of U.S. Provisional Application No. 61/374,578, filed Aug. 17, 2010, all of which are incorporated herein by reference in their entirety.

FIELD OF THE INVENTION

The present invention is generally directed toward the field of electric motors. More specifically, the present invention is directed to outer rotor-type electric motors. Still more specifically, the present invention is directed to rotors of outer rotor-type motors, which tend to be useful for use in direct drive clothes washing machines.

BACKGROUND

Direct drive clothes washing machine motor rotors are directly coupled to the shaft that drives the washing machine to transmit the torque produced by the motor. The types of rotors used in these applications until now fall within in two general categories: plastic rotors and steel rotors. Each general type is associated with advantages and disadvantages. For example, steel rotors, although relatively strong and durable, tend to be relatively heavy and costly. In contrast, plastic rotors tend to be lighter and less costly than steel rotors but because the plastic typically used is significantly less strong and durable than metal, such rotors must be designed to overcome this factor. Typically, the coupling geometry of a plastic rotor must be adjusted to provide a relatively large area of engagement with the drive shaft. This results in a plastic rotor typically having a relatively long axial length, which is not desirable especially for horizontal axis washing machines. Relatively, long axial lengths are not limited to plastic rotors, however, many, if not all, steel rotor designs tend to have relatively overall long axial lengths.

In view of the foregoing, a need still exists for a rotor having one or more of the following characteristics: relatively low cost, relatively short in axial length, relatively light weight, relatively strong/durable coupling with the drive shaft.

BRIEF SUMMARY OF THE INVENTION

According to one aspect of the present invention, a rotor for an outer rotor-type electric motor is provided. The rotor is rotatable about an axis. The rotor comprises a metallic coupler and a polymeric frame including a hub. The metallic coupler includes an inner axial surface configured to interface with a shaft to be driven by the rotor when the motor is energized, an outer axial surface that corresponds to a multiplicity of outer teeth, and a first generally radial surface. The hub engages the first generally radial surface. The outer teeth engage the hub such that torque is transmitted from the coupler to the frame. Each of the outer teeth has a generally arcuate tooth width, $W_{tooth}$, and a radial tooth depth, $D_{tooth}$. Each tooth width $W_{tooth}$ is about 62.5% of the corresponding tooth depth $D_{tooth}$.

According to another aspect of the present invention, a rotor for an outer rotor-type electric motor is provided. The rotor is rotatable about an axis. The rotor comprises a metallic coupler and a polymeric frame including a hub. The metallic coupler includes an inner axial surface configured to interface with a shaft to be driven by the rotor when the motor is energized, an outer axial surface that corresponds to a multiplicity of outer teeth, and a first generally radial surface. The hub engages the first generally radial surface. The outer teeth engage the hub such that torque is transmitted from the coupler to the frame. The coupler has a nominal outer diameter, $OD_{coupler}$. Each of the outer teeth has a radial tooth depth, $D_{tooth}$, that is about 5% of $OD_{coupler}$.

According to another aspect of the present invention, a rotor for an outer rotor-type electric motor is provided. The rotor is rotatable about an axis. The rotor comprises a metallic coupler and a polymeric frame including a hub. The metallic coupler includes an inner axial surface configured to interface with a shaft to be driven by the rotor when the motor is energized, an outer axial surface that corresponds to a multiplicity of outer teeth, and a first generally radial surface. The hub engages the first generally radial surface. The outer teeth engage the hub such that torque is transmitted from the coupler to the frame. The coupler has a height, $H_{coupler}$. Each of the outer teeth has a radial tooth depth, $D_{tooth}$, that is from about 5% to about 10% of $H_{coupler}$.

BRIEF DESCRIPTION OF THE DRAWINGS

FIG. 3 is a top view of a portion of the metal coupler of the present invention, particularly illustrating the preferred outer tooth design.

DETAILED DESCRIPTION OF THE INVENTION

Figure 1:
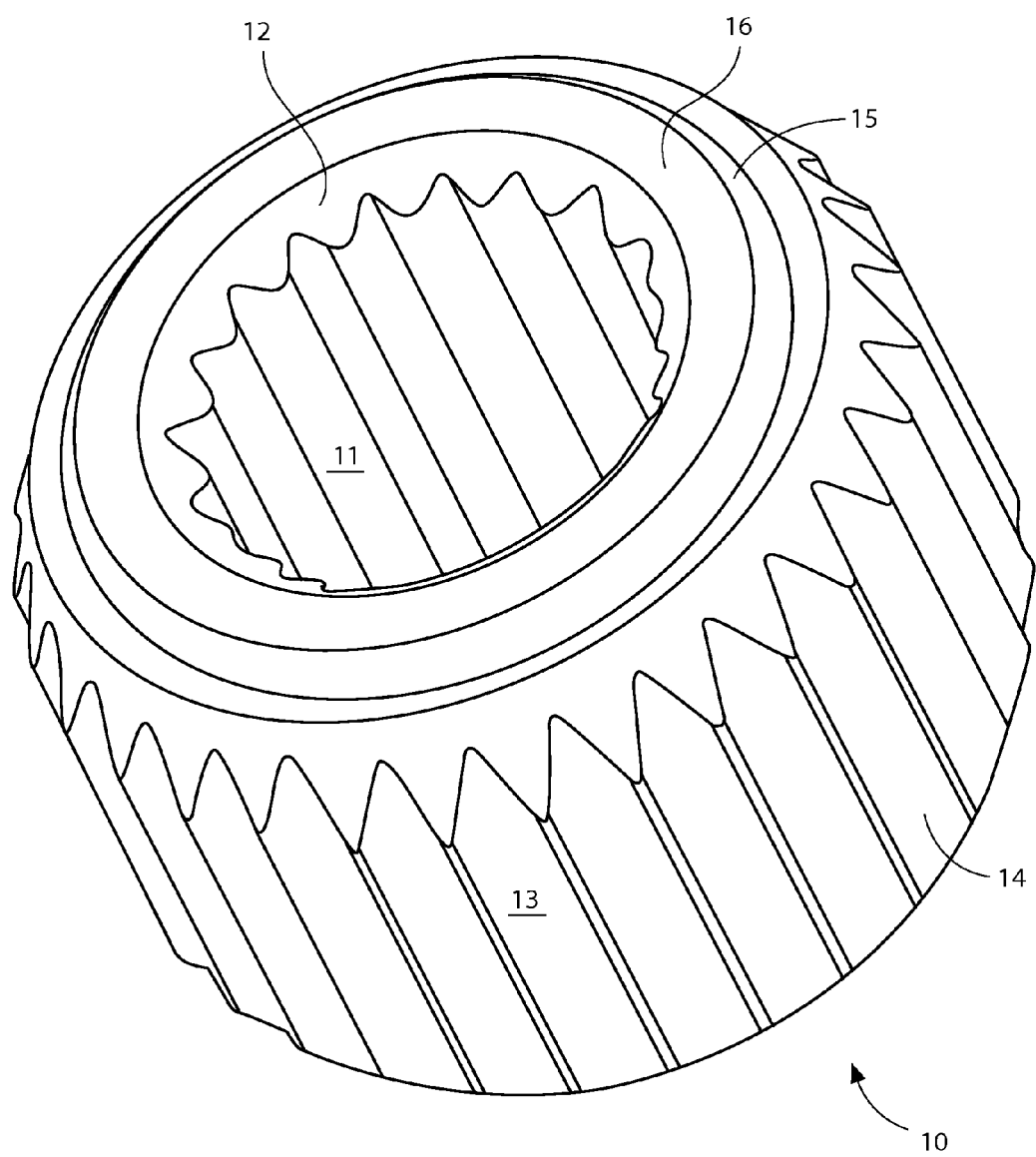
FIG. 1 is a perspective drawing of a metal coupler of the present invention.
Figure 2:
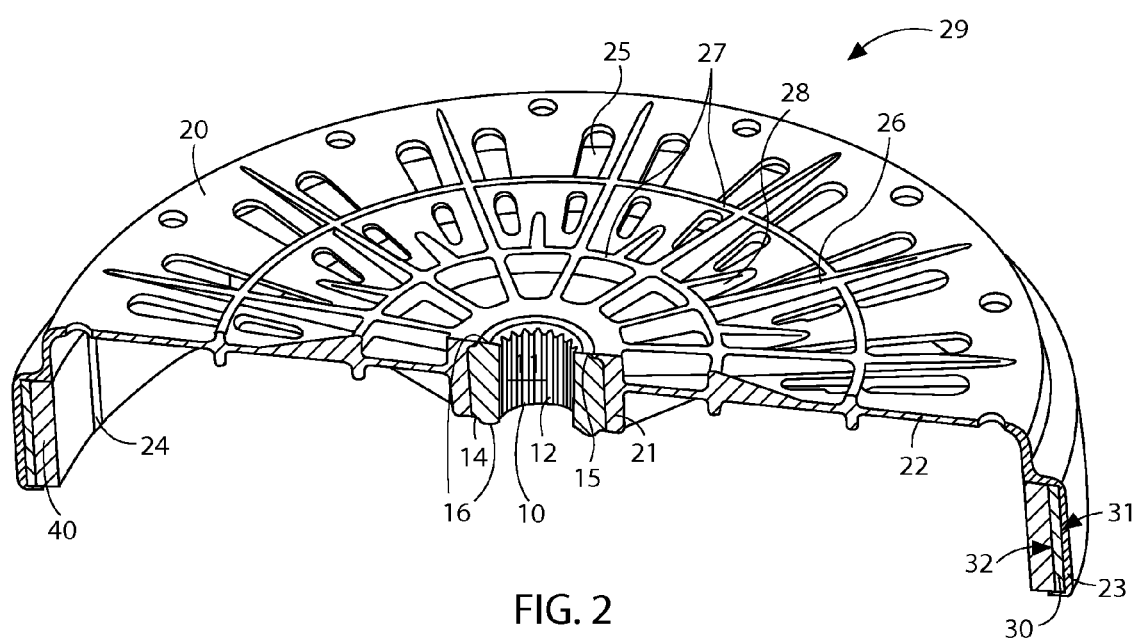
FIG. 2 is a perspective cross-section drawing of a rotor of the present invention.

As mentioned above, the present invention is directed to a rotor for an outer rotor-type electric motor. FIGS. 1-3 show various aspects, which will be described in greater detail below, of an exemplary embodiment of the present invention that is useful as part of an electric motor for operating a clothes washing machine. To be clear, the directions as set forth herein are in reference to a central axis that would be coaxial with the axis of a shaft to which the rotor is connected as part of an electric motor. Additionally, disclosures of typical dimensions are in reference to embodiments in which the present invention is part of a motor used to operate clothes washing machines. The present invention, however, is applicable to other end uses and adjustments to the various dimensions would be made as appropriate for a particular end use.

Referring to FIG. 2, the rotor 29 has a height, $H_{rotor}$, which corresponds to the greatest distance, measured axially, between any two points of the rotor, and an outer diameter, $OD_{rotor}$, which corresponds to the greatest distance, measured radially, between any two points of the rotor. Typically, $H_{rotor}$ is within the range of about 180 mm to about 330 mm (about 7 to about 13 inches) and $OD_{rotor}$ is within the range of about 50 mm to about 100 mm (about 2 to about 4 inches). For example, in the embodiment depicted in FIG. 2, $H_{rotor}$ is about 65.5 mm (about 2.58 in) and $OD_{rotor}$ is about 290 mm (about 11.38 inches).

Metallic Coupler

Referring to FIGS. 1 and 2, the rotor 29 of the present invention comprises, among other things, a metallic coupler 10 having a height, $H_{coupler}$, which corresponds to the greatest distance, measured axially, between any two points of the coupler, and a nominal outer diameter, $OD_{coupler}$, which corresponds to the greatest distance, measured radially, between any two points of the coupler. Typically, $H_{coupler}$ is within the range of about 20 to about 40 mm (about 0.75 to about 1.5 inches) and $OD_{coupler}$ is within the range of about 25 to about 50 mm (about 1 to about 2 inches). For example, in the embodiment depicted in FIG. 1, $H_{coupler}$ is about 28 mm (about 1.10 in) and $OD_{coupler}$ is about 41.5 mm (about 1.63 in). The metallic coupler 10 comprises an inner axial surface 11 configured to interface with a shaft to be driven by the rotor when the motor is energized. The configuration of the inner axial surface may be of nearly any configuration appropriate for the application (e.g., the interface between the inner axial surface and the shaft to be driven is sufficiently secure and robust to withstand and transmit the torque produced by the motor during its useful lifetime, which may be simulated by subjecting a rotor to 7,500 hours at an average elevated wash torque of 25 N-m with a duty cycle of 13 seconds on and 3 seconds off). For example, the shaft may have a circular, square, hexagonal, octagonal, or toothed cross-section (i.e., one or more teeth, which may be, for example, splines, knurl, keys, or combinations thereof) and the inner axial surface will be sufficiently complimentary thereto. To be clear, a generally triangular tooth that has a knurled surface has straight sides whereas a generally triangular tooth that has a splined surface has sides that are curved. As depicted in FIG. 1, in one embodiment of the present invention, the inner axial surface 11 comprises a multiplicity of teeth 12, which are splines.

The metallic coupler 10 further comprises an outer axial surface 13 that corresponds to a multiplicity of outer teeth 14. The outer teeth 14 may be of any configuration (e.g., number, size (e.g., axial length and radial height), shape (e.g., cross-section), spacing (e.g., circumferential)) that is appropriate for the particular application. More particularly, the foregoing configuration options may be selected in various combinations such that interface between the outer axial surface and a polymeric frame (described in greater detail below) is sufficiently secure and robust to withstand and transmit the torque produce by the motor during its useful lifetime. The outer teeth, for example, may be selected from the group consisting of knurls, splines, keys, diamond knurls, or combinations thereof. In one embodiment there are a multiplicity of outer teeth. For example, the number of outer teeth may be at least 10. In another embodiment, the number of outer teeth is least 20 and no more than about 40. In the illustrated embodiment, the outer axial surface 13 comprises a multiplicity of teeth, in particular 30, that are generally triangular with straight sides, which may be referred to as knurls.

A preferred embodiment of the teeth 14 of the outer axial surface 13 is shown in detail in FIG. 3. Each outer tooth 14 defines a peak 14a, with the peaks 14a cooperatively defining the outer circumference of the coupler 10. That is, the generally radial distance $OD_{teeth}$ between opposed peaks 14a is equal to $OD_{coupler}$. Thus, in keeping with the previously described preferred dimensions of the coupler 10 in general, it is preferred that $OD_{teeth}$ is within the range of about 25 to about 50 mm (about 1 to about 2 inches). Most preferably, $OD_{teeth}$ is about 41.5 mm (about 1.63 in).

A valley 14b is defined between each outer tooth 14, with each valley 14b spaced generally radially inwardly from the adjacent peaks 14a. The most preferred generally radial distance between opposed valleys 14b, or the teeth inner diameter $ID_{teeth}$, is about 37.5 mm (about 1.48 in). Thus, in keeping with the most preferred $OD_{teeth}$ of about 41.5 mm (about 1.63 in), it is readily apparent that a most preferred tooth depth $D_{tooth}$ (i.e., the generally radial component of the distance between the peaks 14a and the valleys 14b associated with a given outer tooth 14) of about 2 mm (about 0.08 in) is defined.

It is also readily apparent from the above most preferred dimensions that, in the illustrated embodiment in which thirty (30) outer teeth 14 are provided, a most preferred generally arcuate peak-to-peak spacing $S_{peaks}$ of about 1.38 mm (about 0.05 in) is defined between each adjacent pair of peaks 14a. A generally arcuate valley-to-valley spacing, $S_{valleys}$, which may alternatively be referred to as the tooth width, $W_{tooth}$, of about 1.25 mm (about 0.05 in) is also defined between each adjacent pair of valleys 14b or, alternatively, across the base of each tooth 14.

Thus, the coupler 10 of the present invention may have one or more of the following relative dimensional characteristics:

$W_{tooth}$ is most preferably about 62.5% of $D_{tooth}$;

$D_{tooth}$ is most preferably abut 5% of $OD_{teeth}$ (or $OD_{coupler}$);

$D_{tooth}$ may be from about 5% to about 10% of $H_{coupler}$ and is most preferably about 7.14% of $H_{coupler}$; and $S_{valleys}$ is most preferably about 90.4% of $S_{peaks}$.

The metallic coupler 10 may further comprise one or more annular shoulders 15 radially inward of, and axially outward of each axial end of the outer axial surface 13 and wherein a hub 21 (see below for more a detailed description) is additionally molded over at least one of said annular shoulders 15 such that it is generally flush with axially outermost exterior surfaces 16 of the metallic coupler.

Polymeric Frame

The rotor of the present invention further comprises a polymeric frame 20 that comprises a hub 21 molded over at least the outer axial surface of the metal coupler 13. The hub has an outer diameter, $OD_{hub}$, that is essentially the same as the nominal outer diameter of the couple, $OD_{coupler}$. The polymeric frame further comprises a base 22 that is integrally formed with the hub 21 and extending radially outward therefrom. The base has a thickness, $T_{base}$, which corresponds to the greatest distance, measured axially, between any two points on the opposite sides of the base. The polymeric frames further comprise a side wall 23 that is integrally formed with the base 22, wherein the sidewall has a thickness, $T_{sidewall}$. Typically, $T_{base}$ is within the range of about 1.3 to about 3.5 mm (about 0.05 to about 0.14 in). For the embodiment depicted in FIG. 2, $T_{base}$ is about 2.5 mm (about 0.10 in). The polymeric frame also comprises a multiplicity of magnet spacers 24 each of which is integrally formed with the side wall 23. The polymeric frame may be formed from any polymer appropriate for the application. That said, it is typically desirable to use the lowest cost material that has sufficient physical characteristics. For example, the polymeric frame may be formed from a filled or nonfilled polymer, wherein the polymer is linear, branched, or crosslinked, and is selected from the group consisting of polyester, polyethylene, polypropylene, polyamide, and copolymers thereof. In one embodiment of the present invention the polymer is polypropylene.

The base 22 of the polymeric frame 20 may comprise a one or more openings 25, which may provide benefits such as reduced weight and enhanced cooling. In one embodiment of the present invention the polymeric frame further comprises a multiplicity of openings 25. More specifically, the openings have a total surface area that is within a range that is from about 10% to about 30% of the nominal surface area of the base. More typically, the openings have a total surface area that is within a range that is from about 10% to about 20% of the nominal surface area of the base. For example, the embodiment depicted in FIG. 2 has a base with a nominal surface area of about 54,220 mm2 (about 84 in2) and the openings constitute about 8,880 mm2 (about 13.75 in2), which is about 16% of the nominal surface area.

Reinforcement Ribs

The polymeric frame may comprise a multiplicity of reinforcement ribs 26, 27, 28 each of which integrally formed with at least the base. In the depicted embodiment of the present invention each reinforcement rib has a thickness, $T_{rib}$, that is about equal to $T_{base}$.

Spacer Ribs

One or more of said reinforcement ribs may be integrally formed with a magnets spacer and extend therefrom 26. These ribs may also extend to the hub and be integrally formed therewith. In the depicted embodiment the number of these "spacer ribs" corresponds to the number of magnet spacers.

Concentric Ribs

One or more of said reinforcement ribs may be concentric with the hub 27. Further one or more reinforcement ribs 28 may extend from and be integrally formed with one or more of said concentric ribs.

Backing Ring

The rotor of the present invention further comprises a backing ring 30 having a thickness, $T_{br}$, and a height, $H_{br}$, of a magnetic material molded over by the polymeric frame 20 and having an outer axial surface 31 in contact with the sidewall 23 of the polymeric frame 20. Typically, $T_{br}$ is within the range of about 1.0 to about 5.0 mm (about 0.04 to about 0.20 in) and $H_{br}$ within the range of about 30 to about 45 mm (about 1.18 to about 1.17 in). In the embodiment depicted in FIG. 2, $T_{br}$ is about 2.8 mm (about 0.11 in) and $H_{br}$ is about 36.5 mm (about 1.43 in). The backing ring may be of any appropriate material (e.g., electrical grade steels, high carbon steels, or combinations thereof) and appropriate configuration (discrete pieces of magnetic material in contact with adjacent pieces to form a ring or a multiplicity of layers formed into a ring) for the application. In the depicted embodiment of the present invention a multiplicity of layers of electrical grade steel.

Magnets

The rotor of the present invention further comprises a multiplicity of permanent magnets 40 having a thickness, $T_{magnet}$, and a height, $H_{magnet}$, in contact with an inner axial surface 32 of the backing ring 30 and molded over by the polymeric frame 20 and spaced apart by the magnet spacers 24 of the polymeric frame 20. The magnets may be any appropriate material such as ferrite magnets. Typically, $T_{magnet}$ is within the range of about 5.0 to about 15.0 mm (about 0.20 to about 0.60 in) and $H_{magnet}$ within the range of about 30 to about 45 mm (about 1.18 to about 1.77 in). In the embodiment depicted in FIG. 2, $T_{magnet}$ is about 6.4 mm (about 0.25 in) and $H_{magnet}$ is about 36.5 mm (about 1.43 in).

Rotor Dimensions

The foregoing aspects of the rotor of present invention allow for the design and production of rotors that are able to operate in the clothes washing machines having one or more desirable characteristics such as relatively low cost, relatively short in axial length (especially in view of the ability to have a relatively large diameter), relatively light weight, relatively strong/durable coupling with the drive shaft. More particularly, the present invention may be used to produce a for a rotor to have one or more of the following characteristics:

$T_{br}$ may be about equal to $T_{sidewall}$ and $H_{br}$ may be about equal to $T_{magnet}$;

$H_{magnet}$ may be at least about 50% of the $H_{rotor}$;

$H_{magnet}$ may be at least about 55% of the $H_{rotor}$;

$H_{coupler}$ may be no more than about 45% of $H_{rotor}$;

$H_{coupler}$ may be no more than about 40% of $H_{rotor}$;

$OD_{coupler}$ may be no more than about 20% of $OD_{rotor}$;

$OD_{coupler}$ may be no more than about 15% of $OD_{rotor}$;

$OD_{hub}$ may be less than about 30% of $OD_{rotor}$;

$OD_{hub}$ may be less than about 20% of $OD_{rotor}$;

$T_{base}$ and $T_{sidewall}$ may each be less than $T_{magnet}$; and $T_{base}$ and $T_{sidewall}$ may each be about less than 70% of $T_{magnet}$.

Example

A rotor in accordance with that depicted in FIGS. 1-3 and described in detail above was tested by applying about 40 N-m of torque via a shaft onto which the rotor is installed. In comparison, a rotor with a metallic coupler essentially identical to that of the depicted embodiment except for instead of having other teeth, the metallic coupler has an outer surface that is octagonal. The rotor depicted in the figures having the toothed metallic coupler withstood the application of torque with no visible damage. In contrast, the rotor with octagonal insert was damaged at the interface between the coupler and the hub and the octagonal insert began to rotate within the hub. Finite element analysis of the two rotors showed that plastic hub of the rotor with the octagonal insert saw a maximum stress of about 47.75 MPa whereas the hub of the rotor with the splined metallic insert saw a maximum stress of about 7.25 MPa. Thus, utilizing the splined metallic insert reduced the stress to the plastic hub by about 85%.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations.

The invention claimed is:

1. A rotor for an outer rotor-type electric motor, said rotor being rotatable about an axis, said rotor comprising:
a plurality of permanent magnets;
a polymeric frame supporting the magnets; and
a metallic coupler including— an inner axial surface configured to interface with a shaft to be driven by the rotor when the motor is energized,
an outer axial surface that corresponds to a multiplicity of outer teeth, and
a first generally radial surface,
said polymeric frame including a hub molded over at least the outer axial surface of the metallic coupler,
said hub engaging the first generally radial surface,
said outer teeth engaging the hub such that torque is transmitted from the coupler to the frame,
said coupler having a nominal outer diameter, $OD_{coupler}$, and a height, $H_{coupler}$,
each of said outer teeth having a generally arcuate tooth width, $W_{tooth}$, and a generally radial tooth depth, $D_{tooth}$,
each tooth width $W_{tooth}$ being between about 62% and about 63% of the corresponding tooth depth $D_{tooth}$,
each tooth depth $D_{tooth}$ being between about 4% and about 8% of $OD_{coupler}$, and between about 5% and about 8% of $H_{coupler}$.

2. The rotor of claim 1,
each tooth width $W_{tooth}$ being about 1.25 mm,
each tooth depth $D_{tooth}$ being about 2 mm.

3. The rotor of claim 1,
each tooth depth $D_{tooth}$ being about 2 mm,
$OD_{coupler}$ being between about 25 mm and about 50 mm.

4. The rotor of claim 1,
each tooth depth $D_{tooth}$ being about 5% of $OD_{coupler}$.

5. The rotor of claim 4,
each tooth depth $D_{tooth}$ being about 2 mm,
$OD_{coupler}$ being about 41.5 mm.

6. The rotor of claim 1,
each tooth depth $D_{tooth}$ being about 2 mm,
$H_{coupler}$ being between about 20 mm and about 40 mm.

7. The rotor of claim 1,
each tooth depth $D_{tooth}$ being about 7% of $H_{coupler}$.

8. The rotor of claim 7,
each tooth depth $D_{tooth}$ being about 2 mm,
$H_{coupler}$ being about 28 mm.

9. The rotor of claim 1,
said rotor having an outer diameter, $OD_{rotor}$,
$OD_{coupler}$ being less than about 20% of $OD_{rotor}$.

10. The rotor of claim 9,
$OD_{coupler}$ being less than about 15% of $OD_{rotor}$.

11. The rotor of claim 10,
$OD_{coupler}$ being about 41.5 mm,
$OD_{rotor}$ being about 290 mm.

12. The rotor of claim 1,
said rotor having a height, $H_{rotor}$,
$H_{coupler}$ being no more than about 45% of $H_{rotor}$.

13. The rotor of claim 12,
$H_{coupler}$ being about 28 mm,
$H_{rotor}$ being about 65.5 mm.

14. The rotor of claim 1,
each of said outer teeth defining a peak,
said outer axial surface defining a valley between each adjacent pair of said outer teeth,
adjacent ones of said peaks being spaced apart a generally arcuate distance $S_{peaks}$,
adjacent ones of said valleys being spaced apart a generally arcuate distance $S_{valleys}$,
$S_{valleys}$ being about 90.4% of $S_{peaks}$.

15. The rotor of claim 1,
each of said outer teeth defining a peak,
said outer axial surface defining a valley between each adjacent pair of said outer teeth,
opposed ones of said peaks defining a generally radial distance $OD_{teeth}$ therebetween,
$OD_{teeth}$ being equal to $OD_{coupler}$.

16. The rotor of claim 1,
each of said magnets presenting a height, $H_{magnet}$,
$H_{coupler}$ being about 75% of $H_{magnet}$.

17. The rotor of claim 16,
$H_{coupler}$ being about 28 mm,
$H_{magnet}$ being about 36.5 mm.

18. The rotor of claim 1,
$H_{coupler}$ being between about 20 mm and about 40 mm,
each of said magnets presenting a height, $H_{magnet}$, between about 30 mm and about 45 mm.

19. The rotor of claim 1,
said outer axial surface corresponding to at least 20 and no more than about 40 of said outer teeth.

20. The rotor of claim 1,
said outer teeth selected from the group consisting of knurls, splines, keys, diamond knurls, or combinations thereof.

* * * * *